United States Patent [19]

Tamagawa et al.

[11] 4,433,030

[45] Feb. 21, 1984

[54] PHOTOGRAPHIC SUPPORT

[75] Inventors: Shigehisa Tamagawa; Tetsuro Fuchizawa, both of Shizuoka, Japan

[73] Assignee: Fuji Photo Film Co., Ltd., Kanagawa, Japan

[21] Appl. No.: 372,793

[22] Filed: Apr. 28, 1982

[30] Foreign Application Priority Data

May 11, 1981 [JP] Japan .................................. 56-70378

[51] Int. Cl.$^3$ .............................................. B32B 27/10

[52] U.S. Cl. ................................. 428/476.9; 428/513; 428/514; 428/516; 428/522; 162/168.3

[58] Field of Search ..................... 428/476.9, 513, 514, 428/516, 522; 162/168.3

[56] References Cited

U.S. PATENT DOCUMENTS

| | | | |
|---|---|---|---|
| 4,030,970 | 6/1977 | Tominaga et al. | 428/514 X |
| 4,060,679 | 11/1977 | Naarmann et al. | 428/514 X |
| 4,133,688 | 1/1979 | Sack | 428/514 X |
| 4,226,749 | 10/1980 | Veaute | 428/514 X |

FOREIGN PATENT DOCUMENTS

| | | | |
|---|---|---|---|
| 52-36176 | 3/1977 | Japan | 428/514 |

*Primary Examiner*—P. Ives

*Attorney, Agent, or Firm*—Toren, McGeady and Stanger

[57] ABSTRACT

A water-proof photographic support comprising a paper sheet coated with a polyolefin on both surfaces thereof, in which the paper sheet contains both of an alkylketene dimer and a cationic polyacrylamide.

7 Claims, No Drawings

PHOTOGRAPHIC SUPPORT

BACKGROUND OF THE INVENTION

1. Field of the Invention

This invention relates to a photographic support, and particularly relates to a water-proof photographic support. More particularly, this invention relates to a water-proof photographic support substantially free from being soiled by a developing solution at the edge portion produced by the cutting procedure.

2. Description of the Prior Art

There has been previously employed, as the photographic support, a baryta paper consisting of a paper coated with a baryta layer comprising mainly barium sulfate on one surface. Recently, however, a water-proof photographic support comprising a paper sheet coated with a hydrophobic polyolefin on both surfaces thereof has been developed and employed to cope with the requirement of a rapid development process with an automation system. At the present time, most of the baryta papers have been replaced with the water-proof photographic support.

Nevertheless, even though the water-proof polyolefin layers are provided to the both surfaces, the water-proof photographic support is apt to be soiled by a developing solution at the edge portion produced by the cutting procedure, because the hydrophilic wood pulp fibers constituting the paper sheet are liable to draw the developing solution into the paper sheet from the exposed edge portion. The so-produced edge soiling can be satisfactorily reduced by washing sufficiently the developed photographic paper with water for a long time. However, the washing procedure for a long time is naturally adverse to the requirement for reduction of the development time. For this reason, a measure for preventing permeation of a developing solution from the edge portion has been earnestly studied.

Until now, there is known and generally employed a measure for preventing permeation of a developing solution which involves incorporation of a sizing agent into the paper sheet. However, there necessarily arise various limitations to the sizing agent employable for the purpose, in view of the employment in the specific art of photographic paper. For instance, the sizing agent to be employed should be effective against permeation of either an alkaline or an alcohol such as most generally employed benzyl alcohol, both of which are contained in a developing solution. Moreover, the sizing agent should not decrease whiteness of the photographic paper and should not give any adverse effect to an image produced on the photographic paper such as production of fog. Accordingly, sizing agents generally employable for sizing a paper such as a rosin size and a petroleum resin size are not employable for sizing a paper sheet of the photographic support.

In view of the above-described requirements, there have been proposed a number of specific sizing agents for the use in the photographic support, such as a fatty acid soap sizing agent disclosed in Japanese Patent Publication No. 47(1972)-26,961 and an alkylketene dimer disclosed in Japanese Patent Provisional Publication No. 51(1976)-132,822. These sizing agents, however, are not considered to be satisfactory, because these sizing agents have certain drawbacks. More in detail, the fatty acid soap sizing agent is effective for prevention of permeation of the alcohol, while it is less effective against permeation of the alkaline solution. Moreover, the fatty acid soap is liable to be influenced by the quality of water employed in paper making. For instance, the fatty acid soap precipitates in a hard water to impart poor sizing effect to the paper sheet and/or to bring about disadvantageous features in the paper making process. On the other hand, the alkylketene dimer is effective for preventing permeation of an alkaline solution contained in a developing solution, while it is extremely poor in preventing permeation of the alcohol. Moreover, the satisfactory prevention of permeation of the alkaline solution by the alkylketene dimer is accomplished only in the case where a relatively large amount of a preserving agent, that is, a polyamide-polyamineepichlorohydrin resin is employed together with the alkylketene dimer. Thus, there has not been known a satisfactory sizing agent for the employment in a photographic support.

SUMMARY OF THE INVENTION

The object of the invention, accordingly, is to provide a photographic support capable of effectively keeping either an alkaline solution or an alcohol from permeation into the paper sheet, whereby enabling production of a photographic paper substantially free from the edge soiling, that is, substantially free from being soiled by a developing solution at the edge portion.

Another object of the invention is to provide a photographic support that can be converted to a photographic paper substantially free from edge soiling and further free from disadvantageous photographic features such as formation of fog.

Other objects of the invention will be apparent from the content of the specification.

These objects are accomplished by the present invention that is a water-proof photographic support comprising a paper sheet coated with a polyolefin on both surfaces thereof, in which the paper sheet contains an alkylketene dimer and a cationic polyacrylamide.

DESCRIPTION OF THE PREFERRED EMBODIMENTS

The cationic polyacrylamide of the invention can be selected from materials generally employed as the paper strength increasing agents. Such materials are described, for instance, in Kohbunshi-Ronbun-Shu (Collective Edition of Papers Concerning Polymers), vol. 33, No. 6, p. 309–316 (1970), Japanese Patent Publications No. 52(1977)-47,043 and No. 53(1978)-45,411, and Japanese Patent Provisional Publication No. 55(1980)-6,556. Examples of cationic polyacrylamides preferably employable for the invention include a Mannich modification product of polyacrylamide, a Hofmann degradation product of polyacrylamide, a reaction product between polyacrylamide and polyethyleneimine, and a copolymer of acrylamide with a cationic monomer such as dimethylaminoethyl methacrylate. The cationic polyacrylamide preferably has the molecular weight ranging from 100,000 to 2,000,000 preferably the molecular weight ranging from 500,000 to 1,000,000.

In this invention, replacement of the cationic polyacrylamide with an anionic polyacrylamide such as a copolymer between acrylamide and acrylic acid results in poor prevention of permeation of a developing solution.

The alkylketene dimer preferably has an alkyl group containing 8–30 carbon atoms, and more preferably has an alkyl group containing 12–18 carbon atoms. Examples of the alkylketene dimers include those disclosed in the afore-cited Japanese Patent Provisional Publication No. 51(1976)-132,822 and Tappi, vol. 39, No. 1, p. 21–23 (1956, Technical Association of the Pulp and Paper Industry Inc.). Representative examples of the alkylketene dimers preferably employable for the invention include dodecylketene dimer, tridecylketene dimer, tetradecylketene dimer, pentadecylketene dimer, hexadecylketene dimer, heptadecylketene dimer, and octadecylketene dimer. Mixtures of these alkylketene dimers can be also employed for the purpose.

In this invention, a combination of the cationic polyacrylamide and the alkylketene dimer can be simultaneously or separately incorporated into or applied to a paper sheet by the internal sizing method or the surface sizing method, respectively, the internal sizing method is preferred.

In carrying out the internal sizing method, the alkylketene dimer together with the cationic polyacrylamide is introduced into a pulp slurry, and then a paper is manufactured from the slurry in a conventional way. Thus, the alkylketene dimer and the cationic polyacrylamide are not only provided to the surface of the paper sheet, but also incorporated into the inside of the paper sheet.

In carrying out the surface sizing method, a mixture of the alkylketene dimer and the cationic polyacrylamide is applied to a surface of a paper sheet to coat the sheet with the so-applied mixture.

In the present invention, the alkylketene dimer is preferably contained in the paper sheet in an amount of 0.2–3.0% by weight based on the absolutely dried pulp constituting the paper sheet. The cationic polyacrylamide is preferably contained in the paper sheet in a proportion ranging from 1/10 to 10/1 of the weight of the alkylketene dimer contained in the paper sheet. More preferred range is from 1/4 to 4/1 by weight of the alkylketene dimer.

There is no limitation on nature of the pulp constituting the paper sheet, as far as it belongs to those employable in the manufacture of paper sheets for photographic supports. Examples of the pulp materials include cellulose-type pulps such as wood pulps, esparto pulps, and straw pulps. A part of the cellulose-type pulp material can be replaced with a synthetic pulp material.

In the conventional paper manufacturing art, it is well-known to incorporate into a paper one or more appropriate agents such as a paper strength increasing agent, a fixing agent, a preserving agent, a filler, a dye and an antistatic agent, as well as a sizing agent. In the present invention, the incorporation of these agents can be also done, as far as such incorporation does not bring about adverse effects to the photographic support of the invention. Also permissible is incorporation of a sizing agent other than those specified in the invention, as far as such incorporation does not impart adverse effects to the photographic support of the invention.

The paper sheet containing the alkylketene dimer and the cationic polyacrylamide is then coated on both surfaces with a polyolefin in a conventional way to prepare a photographic support. A polyolefin generally is polyethylene which is an ethylene homopolymer, or a copolymer of ethylene and one or more of copolymerizable monomers. In the polyethylene copolymer, the copolymerizable monomer preferably amounts to not more than 10% by weight of the ethylene content. Examples of the copolymerizable monomers include alfa-olefins such as propylene and butene-1; vinyl compounds such as styrene, vinyl stearate, vinyl acetate, acrylic acid, methyl acrylate, ethyl acrylate, acrylamide, methacrylic acid, methyl methacrylate, ethyl methacrylate, methacrylamide; and diene compounds such as butadiene and isoprene.

The photographic support of the invention contains, as described hereinabove, the alkylketene dimer as well as the cationic polyacrylamide in the paper sheet layer provided between the polyolefin coating layers. This paper sheet layer is prominently resistant to permeation of a developing solution comprising an alkaline solution and an alcohol. This prominent resistance of the paper sheet layer to a developing solution comprising both of the alkaline solution and the alcohol cannot be accomplished if the paper sheet layer contains only one of the combination of the alkylketene dimer and the cationic polyacrylamide.

For the reasons described above, a photographic paper prepared from the photographic support of the invention shows remarkably reduced edge soiling caused in the development process by permeation of a developing solution from the exposed section face of the paper sheet layer produced by cutting, as compared with conventional photographic papers.

The present invention is further illustrated by the following examples, which are by no way intended to restrict the invention.

EXAMPLES

(1) Preparing of Test Samples

To an aqueous slurry containing wood pulp fibers (LBKP/NBKP=1/1) beaten to the Canadian freeness level 260 cc. was added polyamide-polyamine-epichlorohydrin (Kymene 557, trade mark of DIC-HERCULES Co., Ltd., Japan) in the amount of 0.5% by weight (based on the absolutely dried pulp content, the same hereinafter) as a preserving agent. Further added were cationic polyacrylamide (Polystron 705, trade mark of Arakawa Chemicals Co., Ltd., Japan) and alkylketene dimer having an alkyl group of 14–16 carbon atoms (Aquapel, trade mark of the DIC-HERCULES Co., Ltd.), both in the amounts set forth in Table 1. The pulp slurry was then processed in a conventional way to give a paper sheet of the basis weight 170 $g/m^2$.

One surface (back surface) of the paper sheet was coated with polyethylene of the density of approximately 0.980 $g/cm^3$ to form a coating layer of approximately 0.033 mm thick. Another surface (front surface) of the paper sheet was then coated with polyethylene of the density of approximately 0.960 $g/cm^3$ containing titanium dioxide (10% by weight) to form a coating layer of approximately 0.030 mm thick. Thus, waterproof photographic supports (Test Samples No. 1, No. 2 and No. 3) were prepared.

TABLE 1

| Test Sample No. | Cationic Polyacrylamide Amount | Alkylketene Dimer Amount |
|---|---|---|
| 1 | 0.7 wt. % | 0.5 wt. % |
| 2 | 0.7 wt. % | 0.7 wt. % |
| 3 | 1.0 wt. % | 0.5 wt. % |

(2) Preparation of Comparison Test Samples

Three photographic supports were prepared in the same manner as described in the above column (1) using the same aqueous wood pulp slurry thereof, except for the following replacements:

Test Sample No. 4 was prepared using 0.5 wt.% of the alkylketene dimer and using no cationic polyacrylamide;

Test Sample No. 5 was prepared using 0.7 wt.% of the alkylketene dimer and using no cationic polyacrylamide; and Test Sample No. 6 was prepared using 0.5 wt.% of the alkylketene dimer and using 0.7 wt.% of anionic polyacrylamide (Polyacron ST-13, trade mark of Hamano Industry Co., Ltd., Japan) in place of the cationic polyacrylamide.

The six test samples were then subjected to evaluation on the edge soiling liability. The evaluation was carried out by the procedures set forth below.

The photographic support sample was cut to produce a test strip of 8.25 cm wide. The test strip was then developed in Color Paper Automatic Development Apparatus RPV-409 Type (available from Noritu Koki Co., Ltd., Japan), and subjected to eye measurement through a loupe of the depth of developing solution permeation from the edge section face.

The results of the evaluation are set forth in Table 2.

TABLE 2

| Test Sample No. | Depth of Developing Solution Permeation (mm) |
|---|---|
| 1 | 0.28 |
| 2 | 0.22 |
| 3 | 0.21 |
| 4* | 0.65 |
| 5* | 0.50 |
| 6* | 0.66 |

Note:
Test Samples No. 4 through No. 6 given the asterisk all represent test samples for comparison purpose.

The results set forth in Table 2 clearly indicate that the water-proof photographic support of the invention is remarkably improved in the edge soiling liability as compared with the conventional water-proof photographic supports represented by the Comparison Test Samples No. 4 through No. 6.

We claim:

1. A water-proof photographic support comprising a paper sheet coated with a polyolefin on both surfaces thereof, in which the paper sheet contains an alkylketene dimer in an amount of 0.2–3.0% by weight based on the weight of absolutely dried pulp constituting the paper sheet, and a cationic polyacrylamide in an amount of 1/10–10/1 of the weight of the alkylketene dimer.

2. The water-proof photographic support as claimed in claim 1, in which the cationic polyacrylamide is contained in the paper sheet in a proportion ranging from 1/4 to 4/1 of the weight of the alkylketene dimer.

3. The water-proof photographic support as claimed in claim 1, in which the alkylketene dimer has an alkyl group containing 8–30 carbon atoms.

4. The water-proof photographic support as claimed in claim 1, in which the alkylketene dimer has an alkyl group containing 12–18 carbon atoms.

5. The water-proof photographic support as claimed in claim 1, in which the cationic polyacrylamide has the molecular weight ranging from 100,000 to 2,000,000.

6. The water-proof photographic support as claimed in claim 1, in which the cationic polyacrylamide has the molecular weight ranging from 500,000 to 1,000,000.

7. The water-proof photographic support as claimed in claim 1, in which the cationic polyacrylamide is selected from the group consisting of a Mannich modification product of polyacrylamide, a Hofmann degradation product of polyacrylamide, a reaction product between polyacrylamide and polyethyleneimine, and a copolymer of acrylamide with a cationic monomer.

* * * * *